April 7, 1953 F. WALCHER 2,634,409
ELECTRIC SIGNALING DEVICE
Filed Sept. 1, 1949

*INVENTOR.*
FRANK WALCHER
BY
A. Yates Dowell
ATTORNEY

Patented Apr. 7, 1953

2,634,409

UNITED STATES PATENT OFFICE 2,634,409

ELECTRIC SIGNALING DEVICE

Frank Walcher, Chicago, Ill.

Application September 1, 1949, Serial No. 113,660

2 Claims. (Cl. 340—394)

This invention relates to signalling and more particularly to a unitary self-powered bell or buzzer which may be easily adapted for a multiplicity of applications.

A primary object of this invention is the provision of an electrical signalling device having a self-contained power supply in the form of batteries and being adapted for use as a doorbell, burglar alarm, sick-room call bell or for any other use in which an audible signal of this character is required.

It is a further object of the invention to provide an electric signalling device in which any desired circuit closing means to operate the signal may be quickly attached or detached in order to adapt the device to any desired use.

It is a further object of this invention to provide an electric signalling device which may be easily and economically manufactured from readily obtainable material utilizing a minimum of skilled labor resulting in a product which may be sold in a highly competitive market.

Figure 1:
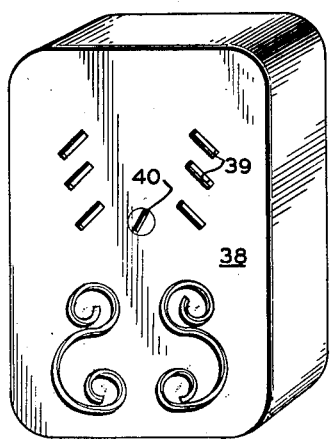
Figure 2:
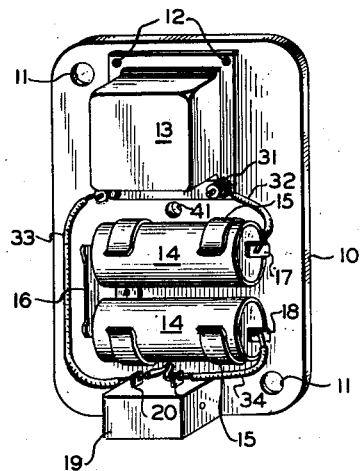
Figure 3:
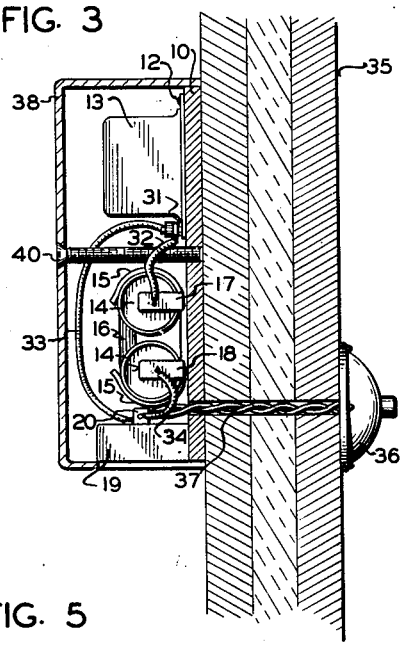
Figure 4:
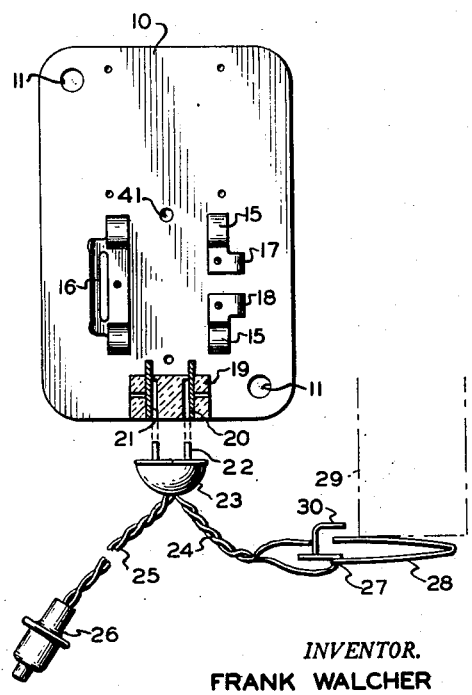
Figure 5:
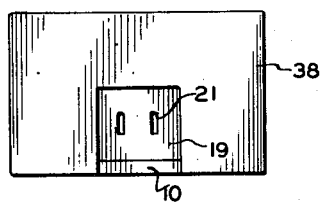

Further objects and advantages of the invention will be apparent from the following description taken in conjunction with the drawings, wherein:

Fig. 1 is a perspective view showing the signalling device of this invention with the cover applied thereto;

Fig. 2, a perspective view with the cover removed and showing the various parts in position on the base plate;

Fig. 3, a sectional view showing the device applied to the framework of a building and intended primarily for use as a doorbell;

Fig. 4, a fragmentary plan view with parts in section for greater clarity and showing the manner in which auxiliary circuit closing means may be quickly connected or disconnected from the device; and, Fig. 5, a bottom plan view showing the arrangement of the receptacle for receiving connector means leading to the auxiliary circuit closing means.

With continued reference to the drawings, a base plate 10 is provided for receiving and supporting the various parts comprising the signalling device of this invention and this base plate is provided with apertures 11 for receiving fastening means to secure the device in position wherever desired. Mounted on the base plate 10 by screw threaded fastening means or the like 12 is a buzzer or bell 13 which may be of conventional construction and any detailed description of this buzzer is deemed unnecessary.

In order to avoid the necessity of supplying an external power supply such as a transformer connected to the conventional house wiring circuit or externally located batteries together with the inconvenient connecting wires, the device of this invention is provided with self-contained batteries in the form of conventional flashlight cells 14 which may be conveniently secured in position on base plate 10 by spring clips or the like 15, contact between the cells being provided by a resilient member 16 and resilient contacts 17 and 18 serving to establish contact with the respective positive and negative contacts of the cells 14 in order to provide an electrical potential for operating the buzzer 13.

Since one of the main objects of this invention is to provide an electric signalling device having a multiplicity of applications there is also provided a female receptacle 19 secured to the base plate 10, this receptacle having contacts 20 and apertures 21 adapted to receive the prongs 22 of a male connector member 23. Conductors 24 and 25 may be attached to the prongs 22 and lead to circuit closing devices such as a pushbutton 26 adapted for location in a sickroom or any other place where it might be desired to actuate the buzzer for the purpose of attracting attention. Conductors 24 may lead to a burglar alarm switch 27 which may conveniently comprise a resilient contact member 28 adapted to be positioned beneath a window or other closure 29 which when in closed position maintains contact 28 out of engagement with fixed contact 30 as will be seen from an inspection of Fig. 4. Unauthorized raising of the window 29 or the opening of any other closure in which the switch 27 is positioned will engage contact 28 with fixed contact 30 to energize the buzzer 13 and give an alarm. Obviously any other desired circuit closing device could be attached to the connector 23 and a plurality of these connectors and associated circuit closing devices might be provided or a plurality of such devices could be connected to one connector 23 where use of the various devices would not be likely to interfere.

The buzzer 13 is provided with binding posts or other suitable connecting means 31 to receive conductors 32 and 33 which are connected respectively to the battery terminal connector 17 and one of the contacts 20 disposed in female receptacle 19. The opposite contact 20 is connected by conductor 34 to the opposite battery terminal connector 18. It will thus be seen that the batteries 14, buzzer 13 and contacts 20 are connected in series whereby bridging of the contacts 20 will result in closing of the circuit and energization of the buzzer 13. As described above, this operation will result when any circuit closing device connected with the contacts 20 is actuated.

As shown in Fig. 3, the signalling device may be conveniently applied to the framework or wall structure 35 of a building and being provided on the exterior thereof, usually adjacent a door or other access opening, with a push button 36 connected by conductors 37 to the contacts 20. In such an installation the device would normally operate as a doorbell or buzzer and when desired auxiliary circuit closing devices could be connected thereto as shown in Fig. 4 and described above.

In order to present a pleasing appearance and to exclude the collection of dust or other foreign matter within the mechanism there may be provided a cover 38 of plastic, metal, or other desired material, this cover being provided with apertures 39 to permit free exit of the sound waves created by the buzzer 13. The cover 38 is secured in place to the base plate 10 by screw threaded fastening means or the like 40 threadedly engaging an aperture 41 in the base plate 10.

It will be seen that by the above described invention there has been provided a relatively simple, unitary, self-contained and self-powered electric signalling device which is pleasing in appearance and which may be normally utilized as a doorbell or buzzer while at the same time the device may be conveniently converted to use as a burglar alarm, sick room call bell or other signalling device without in any way impairing its function as a doorbell and necessitating only the application of a connector member similar to that normally used with conventional electric appliances and requiring no particular skill or dexterity in the application thereof. The batteries comprising the power source may be conveniently renewed by merely removing the cover and the old batteries and snapping new batteries into place within the spring retaining clips.

It will be obvious to those skilled in the art that various changes may be made in the invention without departing from the spirit and scope thereof and therefore this application is not limited by that which is shown in the drawings and described in the specification but only as indicated in the appended claims.

What is claimed is:

1. An electrical signalling device comprising a base, an electrically operated signal mounted on one end of said base and having a pair of connecting means, battery means arranged transversely of said base intermediate the signal and the other end of said base, a first resilient member arranged at one end of said battery means mounted on the base and engageable with one end of said battery means, a second resilient member at the other end of said battery means mounted on said base and insulated from said first resilient means, a receptacle having a pair of spaced contacts insulated from each other and mounted on said base, first electrical conductor means joining one of said connecting means and one of said resilient members, second electrical conductor means joining the said other resilient member and one of said contacts of the receptacle, third electrical conductor means joining the other of said connecting means of the signal and the other contact of said receptacle, a plug having a pair of prongs insertable into and removable from said receptacle for engaging the contacts in said receptacle, and switch means connected to said prongs for closing the circuit to operate the signal.

2. The signalling device according to claim 1 in which the switch means comprises a normally closed switch adapted to be held in open position by a closure and adapted to be closed upon movement of the closure.

FRANK WALCHER.

REFERENCES CITED

The following references are of record in the file of this patent:

UNITED STATES PATENTS

| Number | Name | Date |
|---|---|---|
| 886,355 | Dawson | May 5, 1908 |
| 986,715 | Jacobus | Mar. 14, 1911 |
| 2,228,120 | Koehler | Jan. 7, 1944 |
| 2,446,794 | Thornton | Aug. 10, 1948 |